(12) United States Patent
Van Dijk et al.

(10) Patent No.: US 6,253,968 B1
(45) Date of Patent: Jul. 3, 2001

(54) METHOD AND DEVICE FOR DOSING POWDERED MATERIALS

(75) Inventors: Jakob Van Dijk; Ruud Klarenbeek; Leendert Los; Miro Pobuda, all of Maarssen; Lucas Alphonsus Evers; Ronald Müller, both of Nieuwegein, all of (NL)

(73) Assignee: Diversey Lever Inc., Plymouth, MI (US)

( * ) Notice: Subject to any disclaimer, the term of this patent is extended or adjusted under 35 U.S.C. 154(b) by 0 days.

(21) Appl. No.: 09/233,846

(22) Filed: Jan. 19, 1999

(30) Foreign Application Priority Data

Jan. 21, 1998 (NL) .................................................. 1008080

(51) Int. Cl.$^7$ ...................................................... G01F 11/20
(52) U.S. Cl. ......................... 222/241; 222/200; 222/232; 222/181.2; 417/474
(58) Field of Search ............................. 222/181.2, 181.3, 222/197, 200, 201, 202, 1, 241, 207, 232, 233, 234; 417/53, 474

(56) References Cited

U.S. PATENT DOCUMENTS

| 2,546,852 | * | 3/1951 | Corneil | 103/148 |
|---|---|---|---|---|
| 2,865,537 | | 12/1958 | Jackson | 222/214 |
| 3,083,647 | * | 4/1963 | Muller | 103/148 |
| 4,482,347 | * | 11/1984 | Borsanyi | 604/153 |
| 4,653,987 | * | 3/1987 | Tsuji et al. | 417/360 |
| 4,717,047 | * | 1/1988 | van Overbruggen et al. | 222/207 |
| 4,909,710 | | 3/1990 | Kaplan et al. | 417/53 |
| 5,697,525 | * | 12/1997 | O'Reilly et al. | 222/105 |

FOREIGN PATENT DOCUMENTS

| 214 443 | | 3/1987 | (EP) . | |
|---|---|---|---|---|
| 611 159 | | 8/1994 | (EP) . | |
| 2 111 946 | | 7/1983 | (GB) . | |
| 91/12763 | | 9/1991 | (WO) . | |
| 092019529 A | * | 11/1992 | (WO) | 222/214 |

* cited by examiner

Primary Examiner—Kevin Shaver
Assistant Examiner—Melvin A. Cartagena

(57) ABSTRACT

A method is provided for dosing powdered material from a supply container having a vertically suspending discharge tube of an elastically deformable material, by squeezing said discharge tube at locations, which periodically move along a part of the discharge tube length. In this method, the squeezing of the discharge tube is effected in a similar way as the flexible tube of a peristaltic pump of the type, with which the tube engages a support wall on one side and with which a peristaltic mechanism is provided on the opposite side for squeezing the tube according to a travelling wave, the length of which does not exceed one single wave length.

5 Claims, 7 Drawing Sheets

Fig.1.
Fig.2.
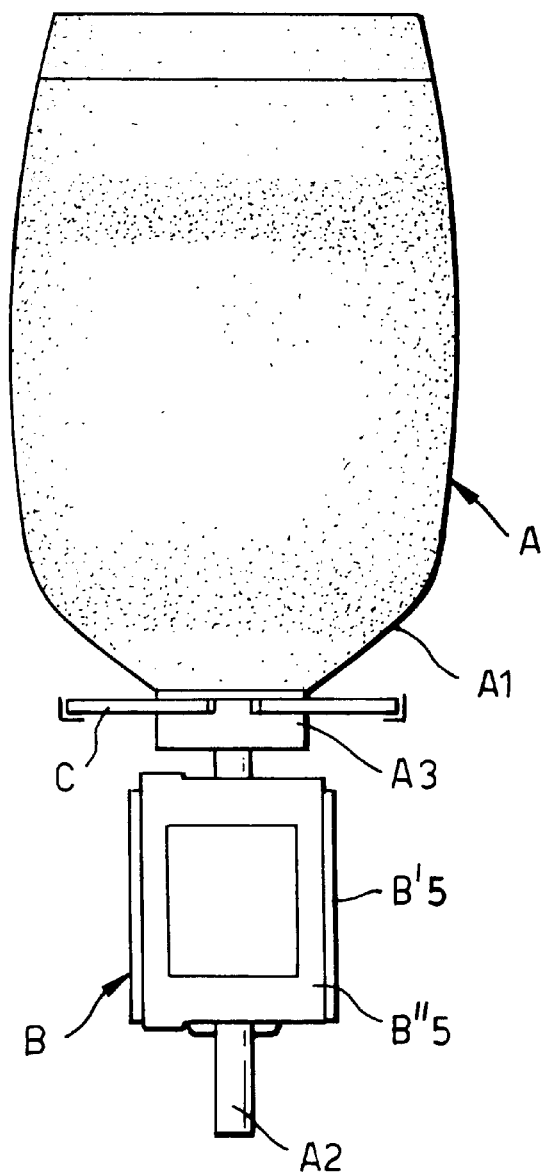
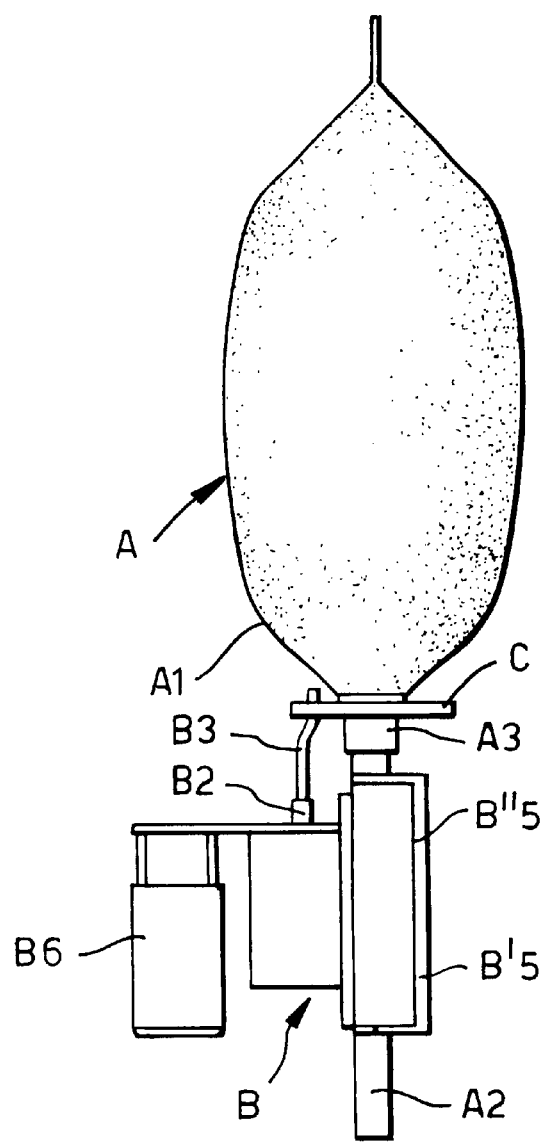

METHOD AND DEVICE FOR DOSING POWDERED MATERIALS

FIELD OF THE INVENTION

This invention relates to the field of dosing powdered materials. Dosing of powdered materials forms a processing step in processes in many fields. As an example reference is made to dosing of detergents in powdered form in cleaning processes, such as in various kinds of washing machines.

BACKGROUND OF THE INVENTION

Representative of the background in the field of dosing detergents in powdered form is British patent specification GB-A 2 111 946, in which a dispensing device for detergents in liquid or powdered form is disclosed. As a step in a programmed cleaning process a powdered detergent is caused to flow from a supply container through an opened valve into a metering cup positioned thereunder. When a desired quantity of the powdered detergent, corresponding to the volume of the metering cup, is to be dispensed for addition to a washing water flow, a delivery valve in the bottom of the metering cup is opened and simultaneously the discharge valve in the lower end of the supply container is closed. In case particulate material is used it is pronosed to vibrate the supply container in order to promote the flow of material within and from the supply container. In this way the tendency of powdered material to arc within the supply container could be opposed indeed. When closing the outlet valve of the supply container, however, a quantity of powder may get caught between the conically shaped valve body and the correspondingly shaped outlet portion of the supply container and get compressed. As a result of this the said outlet valve would not close correctly and the delivery valve of the metering cup, mchanically coupled with said outlet valve, would not open sufficiently, so that the outlet flow from the metering cup would not be satisfactory. Consequently, the manner of dosing as disclosed in patent specification GB-A 2 111 946 would not be suitable for material in powdered form. Another disadvantage of the described batchwise dosing—also called "chamber dosing", is that the dosing volume cannot be adjusted in a simple way. Therefore, in modern fully automatized cleaning processes detergents are hitherto dosed in the liquid state in which the ultimate washing process is taking place. As an example of this "direct dosing" reference is made to the International Patent Application WO 91/12763 and to the European patent document EP-A 0 611 159.

Another example is the dosing of powdered material in the brewing process of drinks, such as coffee, chocolate and the like in drink dispensing machines, wherein powdered material is dosed by means of a rotating screw conveyor, which is supplied from a hopper and is caused to make a number of revolutions, that corresponds with the desired metering amounts.

The powdered material to be dosed is often rather hygroscopic, so that the presence of moisture may lead to the material becoming caked within the screw conveyor; the dosing may even become completely "blocked". On the other hand undesired "afterflow" of powdered material often takes place, either spontaneously or as a result of vibrations transferred to the metering screw.

Attempts have already been made to meet problems connected to dosing of powdered materials.

A proposed solution is disclosed in U.S. Pat. No. 2,865, 537, dating from 1958. Powdered material, such as a detergent is proposed to be metered from a hopper having a discharge tube, by squeezing the discharge tube at places, which periodically move along a tube section of a certain length. The squeezing of the discharge tube is proposed to be effected by means of a set of rotors positioned on opposite sides of the vertically suspending discharge tube and mounted for rotation in opposite directions about horizontal axes, each of said rotors comprising a plurality (sixth) of rollers that are evenly spaced according to a common circumscribed cylinder. The two rotors are placed "out of phase" and radially spaced such, that each time a roller of one rotor projects between two rollers of the second rotor. As seen in a cross-sectional plane perpendicular to the rotor axis, the upstream portion of the discharge tube is deformed by the cooperating rollers to a downstream moving funnel which is closed at its downstream end. According to said funnel travelling further in the downstream direction, it becomes increasingly narrower until the moment, at which the volume of the funnel has in fact been reduced to zero, due to the opposite funnel walls having become superposed and stretched between a roller of one rotor and a roller of the second rotor.

It will be understood, that during travelling of the initially wide funnel in the downstream direction, powdered material tends to be expelled from the narrowing funnel back into the upstream direction. Finally, subject to the type of powdered material and to the degree of elasticity of the wall of the discharge tube, no more than a thin film of the material may collect between the superposed funnel walls. Thereupon, while the superimposed funnel walls are allowed to spread and form a discharge funnel, that is widening in the downstream direction, said thin film of powdered material may easily stick to the funnel walls. Consequently there is in fact no question of dosing in this case.

Now the invention aims at providing a better and more effective solution.

SUMMARY OF THE INVENTION

According to the invention it has been surprisingly found that powdered material may be dosed satisfactorily by means of a certain type of lineary peristaltic pump, which is known as an infusion pump and is disclosed in patent document EP 0214443 and U.S. Pat. No. 4,909,710. Typically this type of peristaltic pump comprises a blade package driven by an eccentric mechanism. A tube-shaped outlet suspending from a supply container engages a support wall and is squeezed by said blade package according to a travelling wave. Essential for the suitability as a dosing device for powdered material is, that the wave profile confined by the tube engaging blade ends of the blade package is active as a closing means through no more than a wave length, so that the tube-shaped outlet will, in general, be squeezed at one location only.

Accordingly, the present invention provides a method for dosing powdered material from a supply container having a vertically suspending discharge tube of an elastically deformable material, by squeezing said discharge tube at locations, which periodically move along a part of the discharge tube length, said method being characterized in that squeezing of the discharge tube is effected in a similar way as the flexible tube of a peristaltic pump of the type, with which the tube engages a support wall on one side and with which a peristaltic mechanism is provided on the opposite side for squeezing the tube according to a travelling wave, the length of which does not exceed one single wave length.

The invention also relates to a device for carrying out the above method, said device comprising a peristaltic pump of the type, with which a tube-shaped outlet suspending from a supply container engages a support wall on one side and with which on the other side of said outlet a blade package to be driven by an eccentric mechanism is provided, the individual blades of which are adapted to squeeze the tube-shaped outlet according to a travelling wave which covers no more than a single wave length, as is known from U.S. Pat. No. 4,909,710. According to the invention this device has been made specifically suitable for dosing powdered material, by coupling the drive motor shaft with means for agitating the discharge portion of the container, said means being provided at a location upstream of the proper pump.

The conditions for a continuous supply of powdered material from the supply container are hereby satisfied. In a practical embodiment of the invention the agitating means are formed by a number of additional blades at a location, where a support wall is missing, said additional blades engaging the discharge tube portion between the proper pump and the container without squeezing (closing) said portion completely.

A further aspect of the invention relates to a supply container in the form of a flexible supply bag having a funnel-shaped discharge portion with an elastically deformable discharge tube integrally connected therewith, in which supply bag a quantity of powdered material is hermetically packed.

DETAILED DESCRIPTION OF THE INVENTION

When applying the method of the present invention the transportation of the individual quantities of powdered material which are successively separated from the supply, is taking place as a controlled falling movement, whereas the supply within the reservoir is effectively kept isolated from the delivery location and will thus be protected against moisture action from that delivery side as well as against uncontrolled dosing. Moreover the overall dosing may be simply adjusted by changing the time during which the pump mechanism is driven.

For an adequate operation it is of course important, that care is taken of a continuous supply flow from the container (i.e. a supply flow that is not stagnating by arcing within the container).

According to a further feature of the present invention the material to be dosed is supplied from a flexible supply bag, in which the material is hermetically packed, said bag being provided with an elastically deformable discharge tube adapted to be used as the tube component of the peristaltic pump. The powdered material is thereby protected against moisture action until it is actually dosed, whereas the unloading supply bag will simply collapse.

Placing a fresh, loaded supply bag into a consumer's device, such as a coffee making machine, is at least as simple as the refilling of a hopper. Until the time of placing of the supply bag into the consumer's device, it can be kept closed by means of a clip, that can be easily removed or made inoperative.

In this connection it is to be noted that it has already been known in the field of ice cream making to pump liquids, such as shampoos, from a hermetically closed supply bag having a discharge tube, by means of a peristaltic pump.

Preferably the supply bag is movably suspended, more particularly by means of one or more springs. The suspension point will thereby become positioned at a gradually higher level, according to the bag being unloaded and becoming collapsed.

A preferred embodiment of the device of the present invention is characterized in that the drive motor shaft is extended in the upstream direction and provided with means for driving a reciprocatingly guided agitating ring around a flexible, funnel-shaped discharge portion of a supply container.

As remarked hereinabove, it is known to hermetically pack liquids in a flexible supply bag provided with an integrally formed resilient discharge tube, that in a later stage may function as the discharge tube in a peristaltic pump. This well-known supply bag is sealed at the free end of the discharge tube. Consequently, placing a (still) sealed supply bag in a dosing device occurs with the discharge tube initially completely filled, so that placing the discharge tube in operative engagement with the blade package of the peristaltic pump, will cause the stationary blade package of the peristaltic pump to force liquid from the discharge tube back into the proper supply bag, after which the e.g. heat sealed end of the discharge tube is simply cut through to put the dosing device in a state ready for use. However, such a procedure can not be carried out in case of powdered material, as powdered material can not be simply forced from the discharge tube back to the proper supply bag.

To enable placing a supply bag filled with powdered material it is proposed, according to the invention, that sealing of the supply bag is effected by means of a self closing clip adapted to be opened against spring action, said clip being provided adjacent the transition between the discharge tube and the funnel-shaped discharge portion. Consequently placement of the supply bag of the invention in the dosing device is taking place with an empty discharge tube; opening of the closing clip will cause the outlet tube to be filled according to the wave profile of the blade package of the peristaltic pump.

The method and device of the invention are suitable for dosing powdered material in the broadest sense, such as dosing of

- various kinds of coffee powder, chocolate powder, mixtures of milk- and chocolate powder,
- dosing of ingredients in powdered form of tea, soups and the like,
- dosing of materials in powdered form, such as (portland) cement, particulate cattle feed and the like;
- furthermore dosing of all kinds of detergents in powdered form, such as powders for domestic and industrial (dish)washing machines, powders for domestic and industrial textile washing machines (such as laundries, heavy duty cleaning), and powders for "hard surface cleaning" and "open-plant cleaning".

Advantages obtained by dosing powdered materials from hermetically closed packings are e.g. the conservation of the aroma of the powder supply in beverage machines, preventing undesired moisture action when using hygroscopic powders and the maintenance of a septic type of sealing of the powder supply. Moreover, the method of the present invention can be adventageously used for packing powdered material.

The invention will be hereinafter further explained by way of a few examples with reference to the accompanying drawing.

FIG. 1 is a diagrammatic front view of a dosing device according to the invention;

FIG. 2 is a diagrammatic side view of the device shown in FIG. 1;

FIG. 3 is a perspective view of the device of FIGS. 1–2, wherein the supply container and the opened pumping mechanism surrounding the tubelike outlet are fragmentarily shown;

Figure 3:
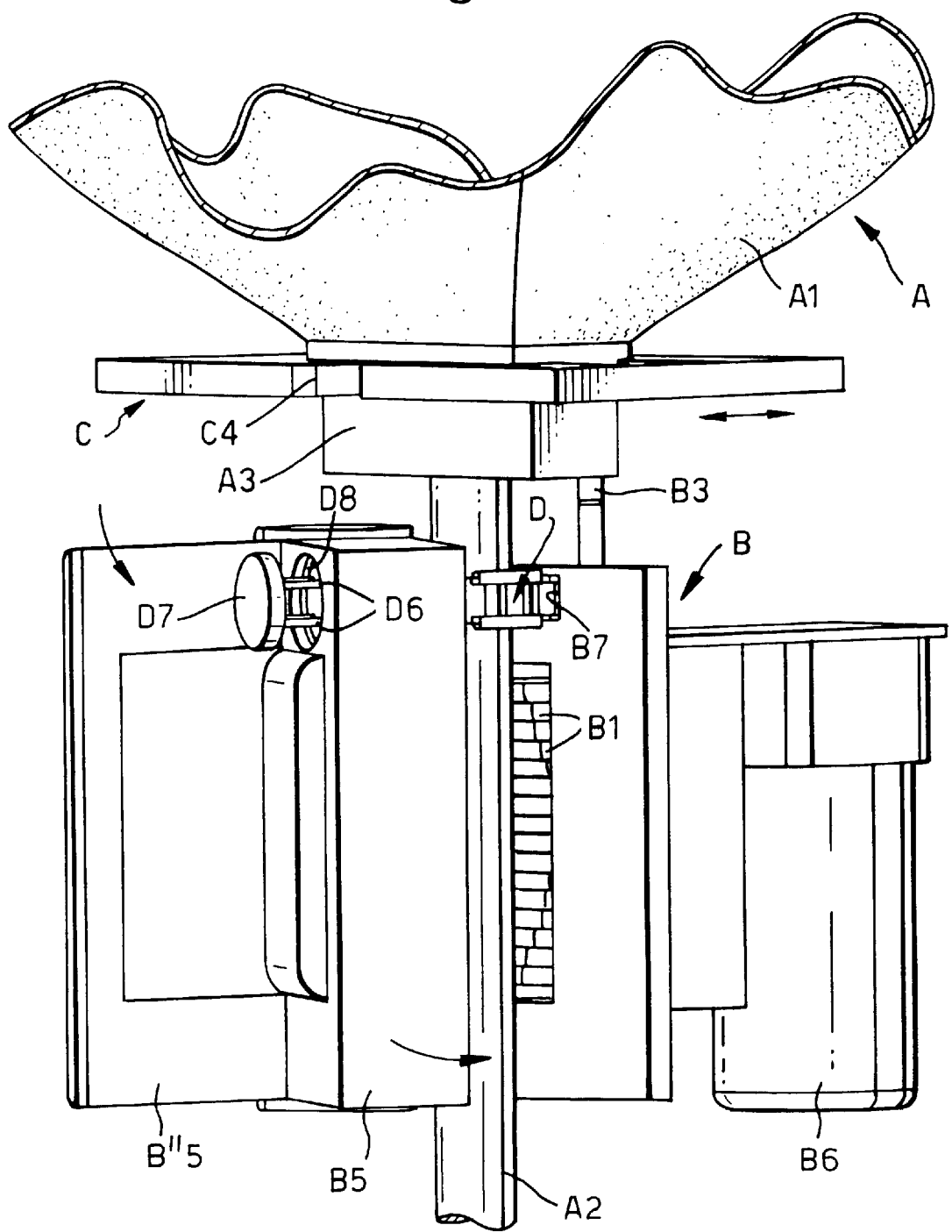
Figure 4:
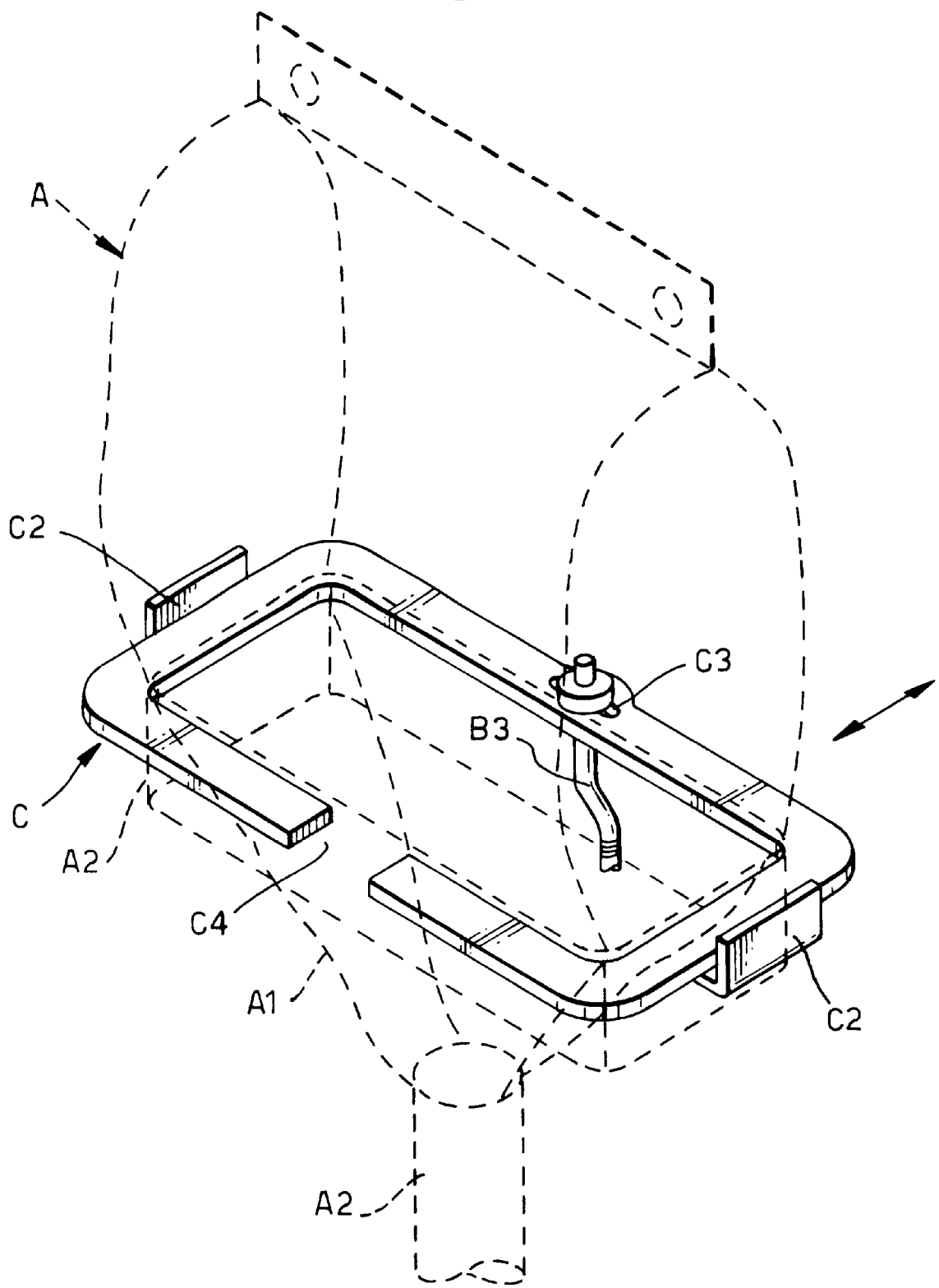
FIG. 4 is a perspective view of the agitating ring used with the dosing device.

In the drawing (FIGS. 1–5) "A" designates a flexible supply bag, e.g. of a suitable plastic, having a narrowing or funnel portion A1, that is surrounded by a skirt A3, and connects to an integrally formed elastically deformable tubelike outlet A2.

Figure 5:
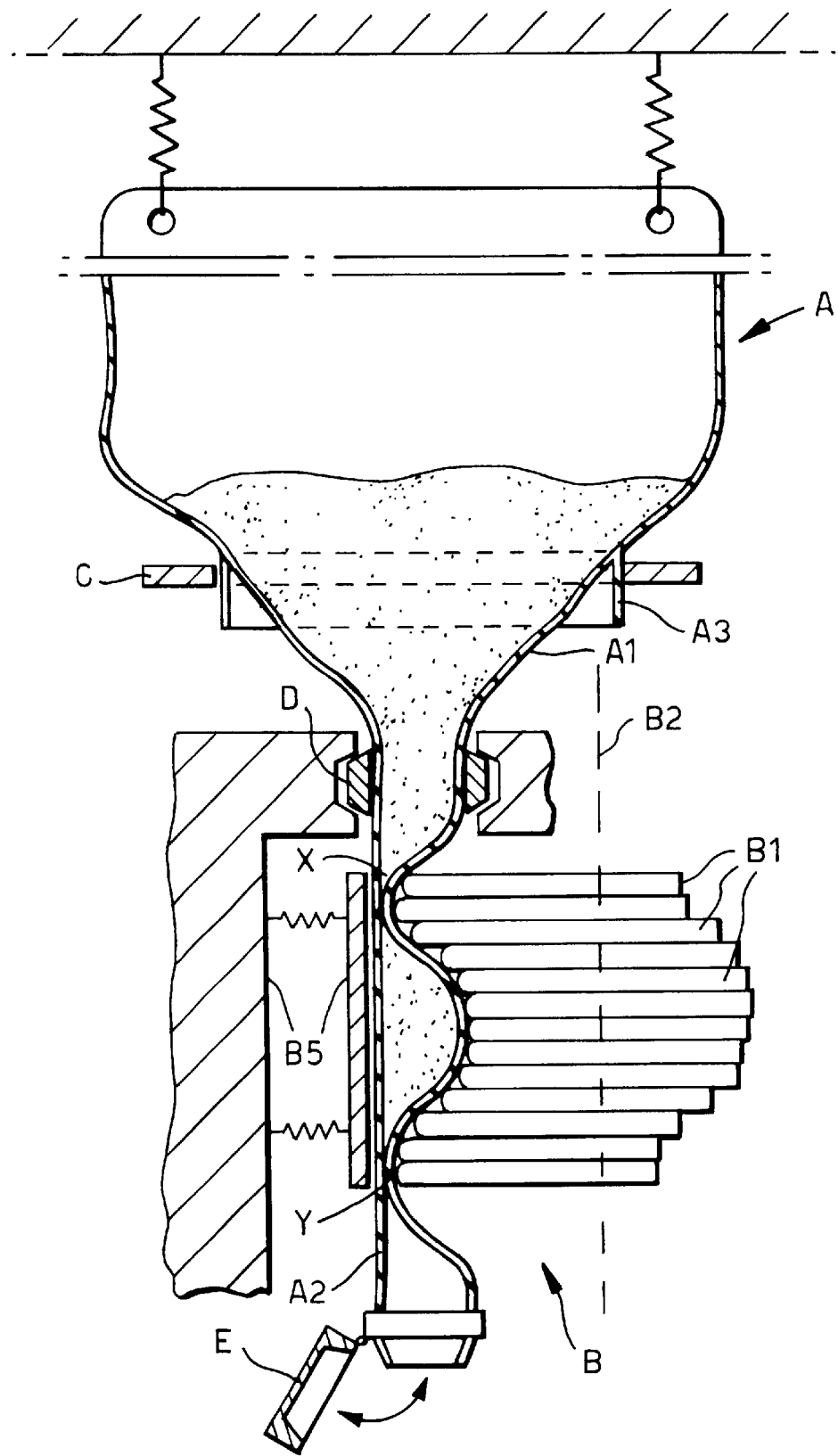
FIG. 5 is a vertical sectional view through the dosing device of FIGS. 1–3, wherein the cooperation between the tubelike container outlet and the blade package of the peristaltic pump is diametrically shown.

A powder to be dosed is hermetically packed within the supply bag. In use the supply bag is suitably supported, e.g. suspended by springs, as is shown in FIG. 5.

In use the outlet A2 is captured between the blade package B1 (FIGS. 3 and 5) and the support wall B5 (FIGS. 3 and 5) of a lineary peristaltic pump "B". The blade package B1 is driven in a well-known manner by a multiple eccentric shaft. B2.

"C" is an agitating ring (see FIG. 4 in particular) surrounding the funnel-like portion A1 of the bag A at the skirt A3, said agitating ring being supported in a guide means C2 for movement in the arrow direction and may be driven in the arrow direction by an upwardly extending, crank-shaped extension B3 of the shaft B2. For this purpose the extension B3 engages at its upper end in a transverse slot C3 of the agitating ring C.

Before describing further details of the structure of the dosing device, a short description of dosing powder will be given first with reference to FIG. 5.

FIG. 5 shows the device at the moment, at which the outlet A2 engaging the support wall B5 is squeezed at two locations x and y by the upper and lower blades respectively of the blade package B1. The direction of rotation of the eccentric shaft B2 and the mutually offset eccentric discs carried by it is such that the upper blade at the moment of FIG. 5 is about to reverse, i.e. about to move away from the outlet tube A2, while the next lower blade is about to squeeze the outlet tube and thereby take the function of the upper blade etcetera, so that the location X moves downwards. The lower blade of the package B1 is also about to move away from the outlet tube A2, while the next higher blades are already moving away from the outlet tube. It will be understood that in this manner the tube is squeezed according to a downwardly running wave (for example a sine).

With reference to FIGS. 3 and 5 D is a self closing clip which is placed about the outlet tube at a position just below the transition from the funnel-like portion Al to said outlet tube A2, said clip being adapted to be automatically opened when the supply bag A is placed and the support wall B5 is moved in the closed position. The self closing clip D will hereinafter be further described. By using the self closing clip D the installation of a new, filled supply container A will take place with an empty outlet tube A2, which can be readily deformed to the operative state shown in FIG. 5 when the pump is closed.

Preferably the outlet tube is caused to deform before the closing clip D is opened. This may be realized by making the support wall portion B5 of the pump B in two parts which are adapted to be closed one after the other (FIG. 3), as will be further described hereinafter.

In addition to the self closing clip D another closing valve E may be provided at the lower end of the outlet tube A2. Such a valve allows to prevent, when a partially filled supply bag A is prematurely taken out, a certain amount of powder from flowing out, which would be undesirable. This valve may e.g. automatically closed when the pump is opened.

The dosing device described hereinabove may be put into operation e.g. by pressing a control button of a beverage dispensing machine or washing machine, of which the dosing device is making a part. Pressing of the control button results in energization of the drive motor B6 of the pump B, so that the eccentric shaft B2 is rotated and the blade package B1 will carry out its peristaltic movement. In use the agitating ring C is taking care of a continuous supply of powdered material from the container A at the upstream end of the outlet tube A2.

Preferably the pump B and its drive motor B6 are making part of a circuit, that causes the pump, at the end of a certain dosing, to come to a standstill at the moment, at which the lower blade of the blade package is in its closing position (yet). In this manner an exact dosing can be obtained according to a predetermined number of revolutions of the pump shaft.

Figure 6:
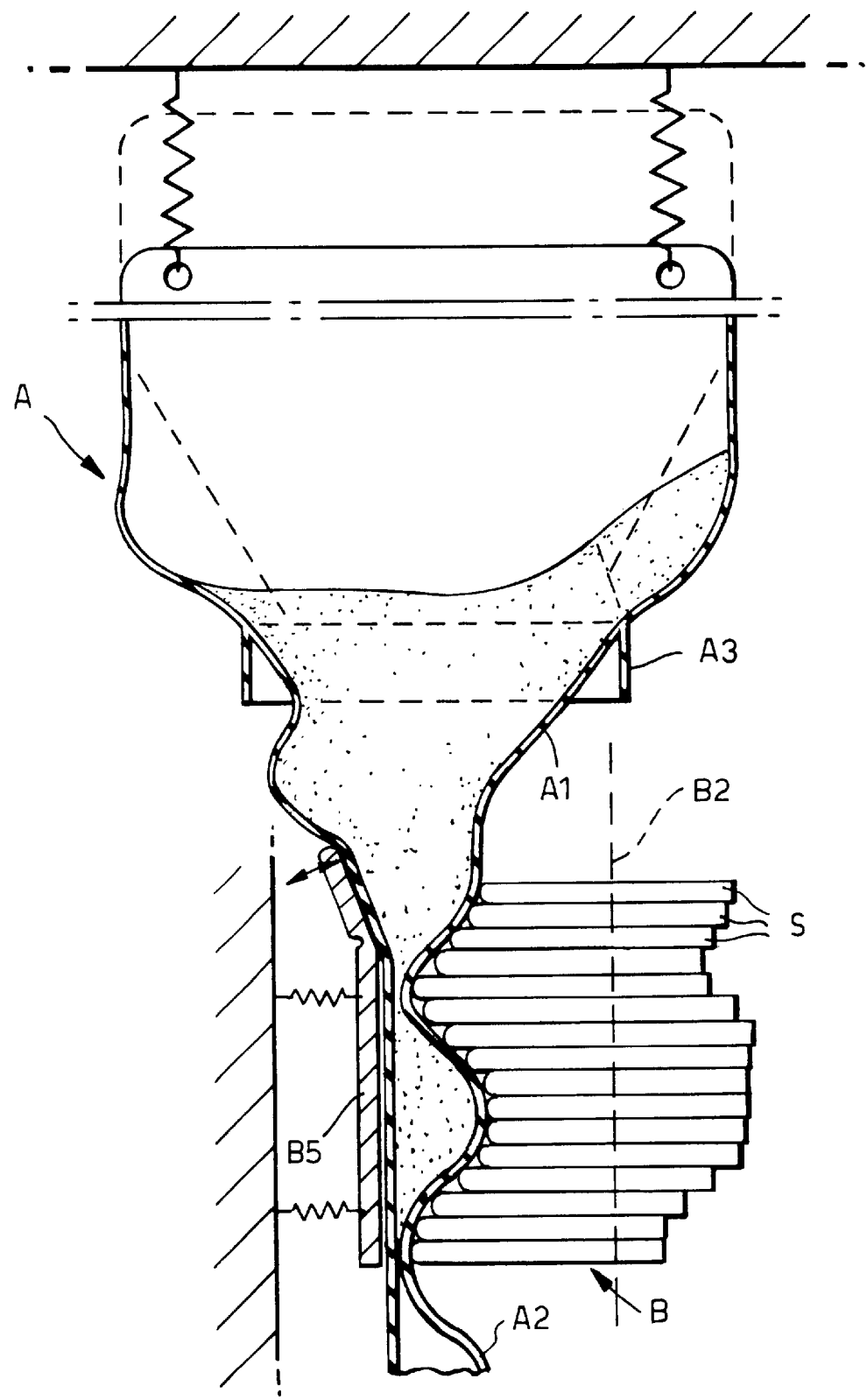
FIG. 6 shows a modification of the device of FIG. 5.

In the modified embodiment according to FIG. 6 agitating of the powdered material in the transitional area between the funnel-shaped portion Al and the upstream end of the outlet tube A2 is effected by means of a few (e.g. four) additional blades S, which are an upstream extension of the blade package B1 of FIG. 5. As distinguished from the other blades of the blade package B1 the additional blades S do not take part in the periodical closing procedure of the outlet tube A2, due to the fact that the support wall is either missing or made flexible in the area of the added blades S. The additional blades S may perform their agitating action either in lieu of or in combination with the agitating ring C in FIG. 5.

The self closing tube clip D will now be further described with reference to FIGS. 7–9.

Figure 7:
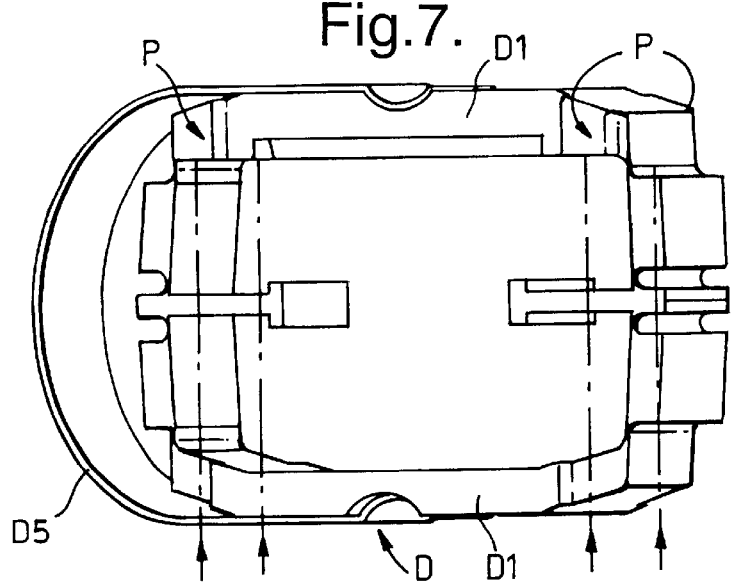
FIG. 7 is a perspective view on an enlarged scale of a self closing tube clip, in the opened position.
Figure 8:
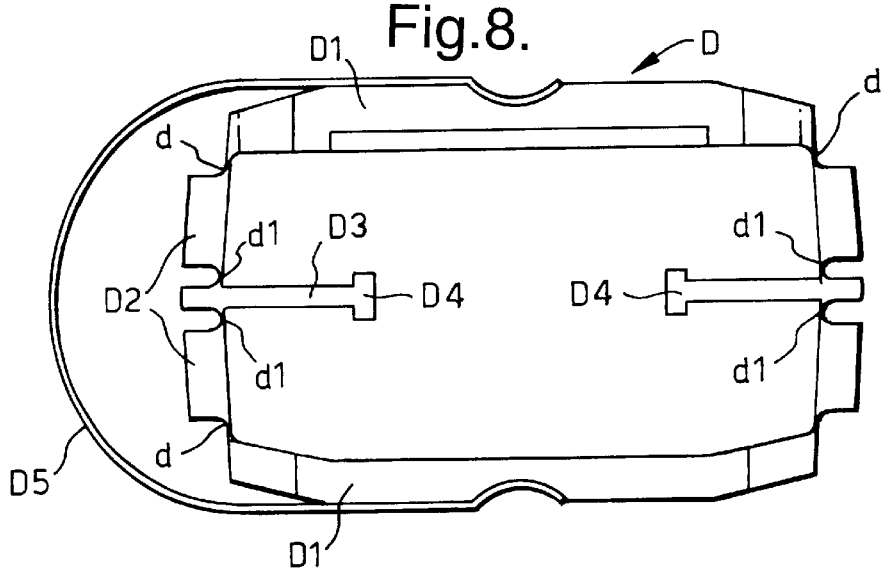
FIG. 8 shows an end view of the tube clip of FIG. 7.

A clip D is formed e.g. of a suitable plastic and is in fact a hexagonal linkage (articulated hexagon); in the closed position of the clip it is of a substantially rectangular shape (FIGS. 7 and 8). The two opposite rectangle sides D1 of said rectangle function as clamping bars, between which the outlet tube A2 has to be squeezed. The other two opposite rectangle sides D2 are pivotally connected, at the angles d, to the clamping bars D1 by means of bridge portions of reduced thickness and function as connecting rods between the clamping bars. The connecting rods D2 are provided with ledges D3 which extend from the centre towards one another and have a widened foot D4 at their free end. On both sides of the root of each ledge D3 there are connecting bridges d2 of reduced thickness, due to which the rectangle sides or connecting rods D2 may, from the slightly outwardly bent, but substantially stretched state with the clip in the opened position (FIGS. 7 and 8), fold together to allow the clip to close (FIG. 9).

D5 designates an omega-shaped spring blade, which engages the proper clip body from aside and has its leg ends engaging corresponding recesses on the outer side of the clamping bars D1. The spring D5 is pretensioned in the closing direction of the clip and therefore tends to press the clamping bars D1 together, as is shown in FIG. 9, wherein the outlet tube A2 is in a flatted and thus closed state between the clamping bars D1.

Figure 9:
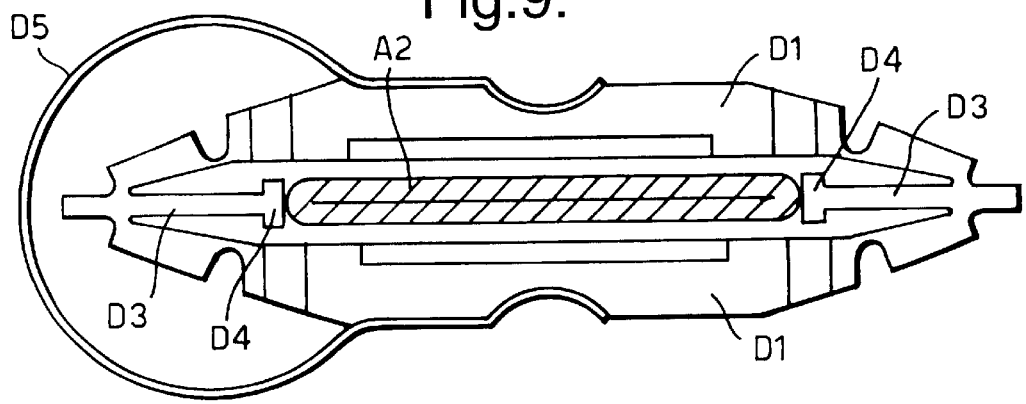
FIG. 9 shows an end view of the tube clip of FIG. 8, in the closed position.

In order to enable the clip D to open from the closed position of FIG. 9, one of the clamping bars D1 (i.e. the upper clamping bar in FIGS. 7 and 8) is widened to both sides at the two ends, at p, in a direction perpendicular to the plane of the clip. As a result of this four bearing faces are formed at the respective clamping bar D1 for engagement of the free ends of four pins which may, as seen in FIG. 7, be moved in the arrow direction according to the dash dotted lines so as to press the upper clamping bar D1 away from the lower clamping bar and thereby cause the clip to open.

When the upper clamping bar D1 is pushed open the connecting rods D2 are stretched, whereby the ledges D3 move with their widened feet D4 towards one another and the previously flat squeezed outlet tube A2 therebetween is urged into the opened, circular shape.

Figure 10:
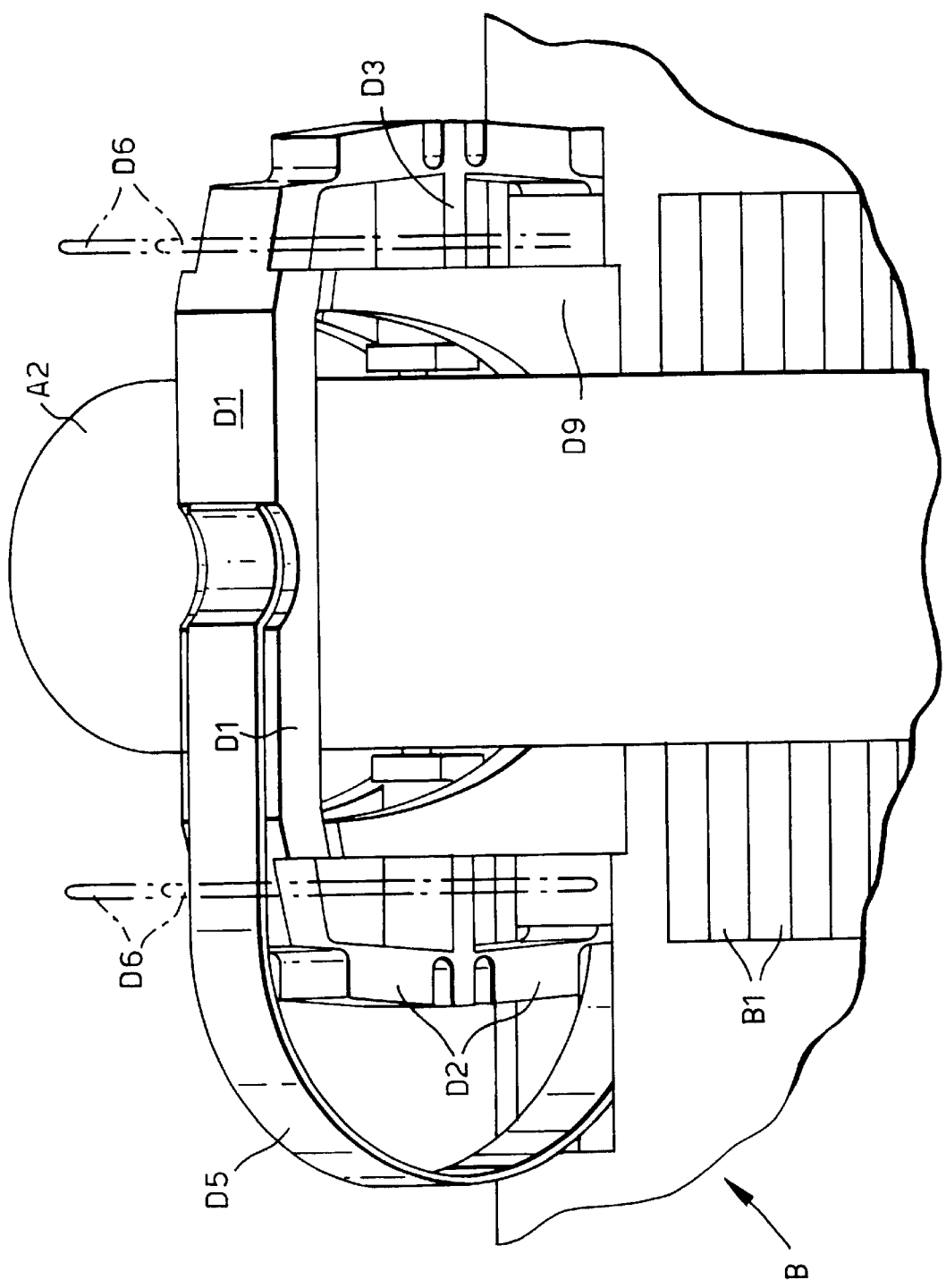
FIG. 10 is a diagrammatic perspective view on a still larger scale of the upper portion of the pumping house, with the tube clip in the opened position, while the movable part of the pumping housing has been omitted for sake of clarity.

With reference to FIGS. 3 and 10 the installment of a fresh supply bag A will now be described.

FIG. 3 shows the pump B in its opened position, i.e. with the two part pressure wall B5, consisting of a hinged inner pressure wall B'5 and a hinged outer pressure wall B"5, being swung into the opened position. To install the fresh supply bag A it is inserted with its tube-shaped outlet A2 from the front side of the device through the slot C4 of the agitating ring C and then lowered with its skirt A3 into the ring C. The clip D is in the closed position and becomes partly sunk in a chamber D7 which is recessed in the upper portion of the fixed pump housing.

Starting from the position shown in FIG. 3 the inner pressure wall B'5 is closed first, due to which the still empty outlet tube A2 is (resiliently) pressed towards the forwardly projecting blade package B1 and is thereby deformed according to the operative profile shown in FIG. 5. In this stage the clip D is still closed and the forwardly directed half of the clip is received in a recess (not shown in the drawing) on the inner side of the upper portion of the closed inner pressure wall B'5.

Four pins D, which have already been briefly mentioned hereinabove, are provided for opening the clip D. The four pins D6 are mounted for a sliding movement in the upper portion of the inner pressure wall B'5 and may, while the pressure wall B'5 is closed, move along the dash dotted lines in FIG. 7 to push the clip D open in the manner described hereinabove. The four pins D6 project from a bridge piece D7, that cooperates with the outer pressure wall B"5, such that closing of the outer pressure wall causes said bridge piece to be pushed from its forward retracted position rearwards into a corresponding recess D8 in the previously closed inner pressure wall B'5 so as to cause the pins D6 to fulfill their function.

FIG. 10 shows the clip D after it has been pushed open by said four pins D6. In order to show this position clearly the two closed pressure walls B'5 and B"5 have been omitted. Furthermore a support element D9 is shown that supports the clip D while it is being pushed open.

What is claimed is:

1. A device for dosing powdered material from a supply container, comprising a lineary peristaltic pump, with which a tube-shaped outlet suspending from the supply container engages a support wall on one side and with which another side of said outlet a blade package to be driven by an eccentric mechanism, the individual blades of which are adapted to squeeze the tube-shaped outlet according to a travelling wave which covers on more than a single wave length, characterized in that a drive motor shaft is coupled with means for agitating a discharge potion of the container, said means being provided at a location upstream of the pump.

2. The device according to claim 1, characterized in that the agitating means are formed by a number of additional blades at a location, where a support wall is missing, said additional blades engaging a discharge tube portion between the pump and the container without squeezing said portion completely.

3. The device according to claim 1, characterized in that the drive motor shaft is extended in the upstream direction and provided with means for driving a redprocatingly guided agitating ring around a flexible, funnel-shaped discharge portion of said supply container.

4. The device according to claim 3, characterized in that the extended drive motor shaft engages, in a crank type fashion, a slot provided in said agitating ring in a direction transverse to the reciprocating movement of said agitating ring.

5. The device according to claim 3, characterized in that the agitating ring is provided with a slit for inserting the discharge portion of the supply container from the front side.

* * * * *